United States Patent [19]

Takaoka et al.

[11] 4,093,162
[45] June 6, 1978

[54] TRAIN OPERATION CONTROL APPARATUS

[75] Inventors: Tadashi Takaoka, Ibaraki; Eiichi Toyota, Katsuta, both of Japan

[73] Assignee: Hitachi, Ltd., Japan

[21] Appl. No.: 768,753

[22] Filed: Feb. 15, 1977

[30] Foreign Application Priority Data

Feb. 20, 1976 Japan .................................. 51-17054

[51] Int. Cl.² .............................................. B61L 3/00
[52] U.S. Cl. .............................. 246/182 B; 246/187 B; 364/426
[58] Field of Search ........... 246/182 B, 187 B, 182 C; 235/150.2, 150.24, 151.32, 92 TC, 153 AP; 340/146.1 BA

[56] References Cited

U.S. PATENT DOCUMENTS

| | | | |
|---|---|---|---|
| 3,058,655 | 10/1962 | Arneth | 235/153 AP |
| 3,639,754 | 2/1972 | Kovalcik | 246/182 B |
| 3,655,962 | 4/1972 | Koch | 246/187 B |
| 3,872,288 | 3/1975 | Sampey | 235/151.32 |

*Primary Examiner*—Trygve M. Blix
*Assistant Examiner*—Reinhard J. Eisenzopf
*Attorney, Agent, or Firm*—Craig & Antonelli

[57] ABSTRACT

A train operation control apparatus includes a memory for prestoring speed instructions in accordance with the travelled distances of a train and a counter which starts to operate upon train's passing through a predetermined point to count input signals representative of a travel speed of the train. A speed instruction is read out of the memory in response to a content of the counter so that the train follows the speed instruction. Before the operation of the counter is started, a maximum count of the counter is preset so that a minimum speed instruction is read out of the memory at the start of operation, and based on the content thereof a fault of the counter is detected so that a brake instruction is issued to the train.

6 Claims, 10 Drawing Figures

FIG. 6

| OUTPUT OF FLIP-FLOPS \ COUNT OF COUNTER (ADDRESS DESIGNATED BY THE COUNTER) | 255 ADDRESS-DESIGNATED DURING STAND-BY MODE | 0 | 1 | 2 | 3 | 4 | 5 | 6 | 7 | 8 | 9 | ... | 253 | 254 | 255 ADDRESS-DESIGNATED DURING STAND-BY MODE | 0 |
|---|---|---|---|---|---|---|---|---|---|---|---|---|---|---|---|---|
| 1st FLIP-FLOP OR BIT ($2^0$) | — | O | — | O | — | O | — | O | — | O | | | — | O | — | O |
| 2nd FLIP-FLOP OR BIT ($2^1$) | — | O | O | — | — | O | O | — | — | O | | | O | — | — | O |
| 3rd FLIP-FLOP OR BIT ($2^2$) | — | O | O | O | O | — | — | — | — | O | | | — | — | — | O |
| 4th FLIP-FLOP OR BIT ($2^3$) | — | O | O | O | O | O | O | O | O | — | | | — | — | — | O |
| 5th FLIP-FLOP OR BIT ($2^4$) | — | O | O | O | O | O | O | O | O | O | | | — | — | — | O |
| 6th FLIP-FLOP OR BIT ($2^5$) | — | O | O | O | O | O | O | O | O | O | | | — | — | — | O |
| 7th FLIP-FLOP OR BIT ($2^6$) | — | O | O | O | O | O | O | O | O | O | | | — | — | — | O |
| 8th FLIP-FLOP OR BIT ($2^7$) | — | O | O | O | O | O | O | O | O | O | | | — | — | — | O |

TRAIN OPERATION CONTROL APPARATUS

The present invention relates to a train operation control apparatus, and more particularly to such an apparatus to make a train follow a speed instruction in accordance with a distance which the train is to travel until it reaches a stop point.

Known train operation control apparatus of this type includes a fixed point stop control apparatus which automatically stops a train at a given position in a station without error and with a confortable feeling to passengers, or an automatic train stop apparatus (ATS) which automatically stops a train in front of a stop signal.

In such a stop control for the train, the train receives a signal from a transmitter provided along a railway at a predetermined distance in front of the stop point, that is, a signalling point, and generates a speed instruction which changes in accordance with a predetermined stop pattern with an increase of the distance which the train has travelled from the signalling point. The speed instruction is compared with an actual speed of the train and a brake control is effected such that the train speed does not exceed the speed instruction. Normally, the stop pattern is a quadratic curve giving a predetermined rate of deceleration.

High safety is required for the operation of such trains as electric trains. Because of such requirement, the train operation control apparatus for controlling the operation for such as start, run and stop of the train must ensure reliable operation. To this end, the train operation control apparatus is constructed by using digital circuits. Particularly, the control apparatus in the ATS system comprises a counter for digitally counting pulses of a frequency which is proportional to a speed of the train and a stop pattern generating circuit which produces, according to the content of the counter, an output which substantially follows a predetermined stop pattern. This control apparatus has a disadvantage of the complexity of circuit when the stop pattern is to be modified in accordance with running conditions. For this reason, it has been recently proposed to prestore speed instructions according to a predetermined stop pattern in a read only memory (ROM) and the speed instructions are read out of the memory succeedingly in accordance with variation of the distance which the train has travelled from a given point and the train is caused to follow the speed instructions.

The proposed train operation control apparatus includes a ROM for prestoring speed instructions according to a predetermined stop pattern and a counter for counting pulses of a frequency which is proportional to a speed of the train, that is, the content of the counter is representative of a travel distance, and the speed instructions are read out succeedingly from the locations of the memory addressed by the content of the counter. The counter used in this train operation control apparatus is constructed by flip-flops and is an 8-bit binary counter, for example. Since a count output of the counter is used as a signal to designate an address of the memory to read out a desired speed instruction from the memory, if the counter fails, it may cause accident such as an overrun of the train. For example, in case a most significant bit of the counter fails, the content of the counter is reset to "0" when it reaches one half of the full capacity. And then, the first address, that is, the address "0" of the memory will be erroneously read out. As a result, the speed instruction read out of the memory does not follow a correct stop pattern and the train may not stop at the desired point but overrun which may result in a serious accident.

Accordingly, the counter plays a very important role in assuring the safety of operation of the train.

It is an object of the present invention to provide a train operation control apparatus which checks the operation of a counter when an operation instruction is issued to the counter to detect a fault in the counter prior to readout of a speed instruction from a memory so that even if the counter fails, brakes are applied to the train to ensure the safe operation of the train.

According to the present invention, the train operation control apparatus comprises a memory for prestoring speed instructions in accordance with the travelled distances of the train, a counter which starts its operation upon train's passing through a predetermined point to count input signals depending on a travel speed of the train so that a content of the counter is representative of a travelled distance of the train, speed instructions being read out of the memory succeedingly in accordance with change of the content of the counter, said counter being preset to its maximum count prior to the start of the operation, a fault detection circuit which reads out a minimum speed instruction from the memory in accordance with the content of the counter to determine the fault of the counter based on the read out content, and a brake instruction circuit for producing a brake instruction to apply brakes to the train in response to an output of the fault detection circuit.

The above and other objects, features and advantages of the present invention will become more apparent from the following description of preferred embodiments of the invention when taken in conjunction with the accompanying drawings, in which:

FIG. 6 is a chart for explaining the content of the counter.

Figure 1:
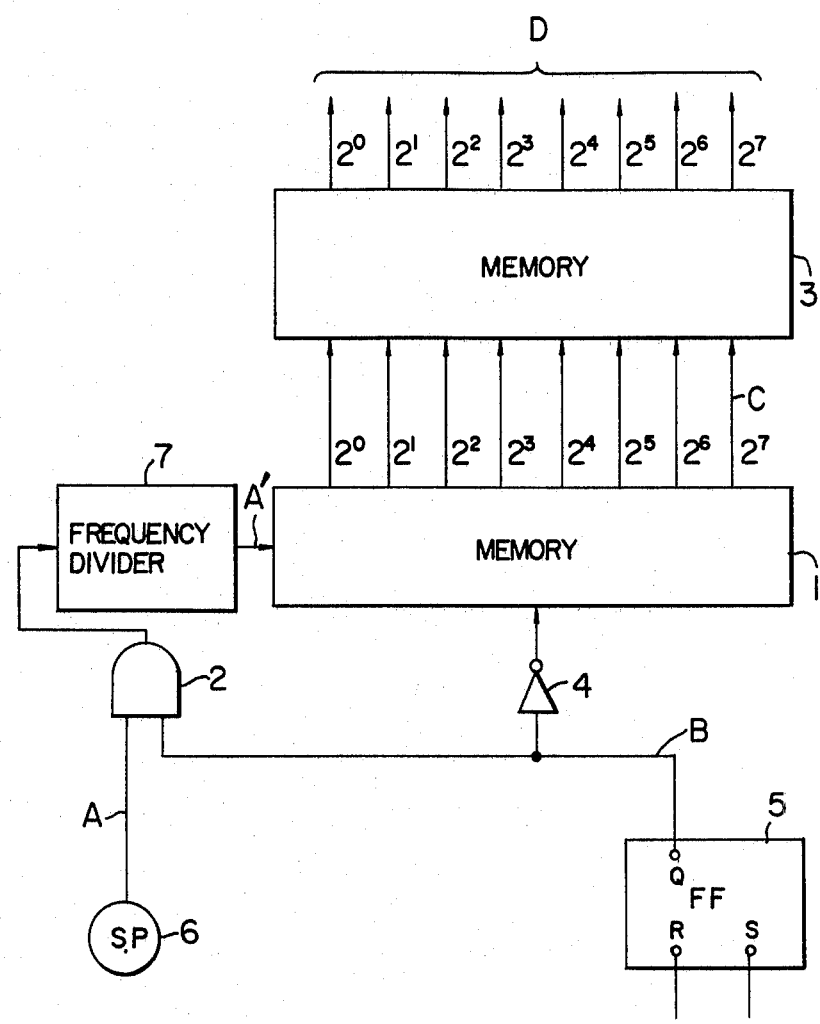
FIG. 1 is a block diagram showing a basic configuration of a train operation control apparatus to which the present invention is applied.

Referring to FIG. 1, a basic configuration of a train operation control apparatus to which the present invention is applied is explained.

Numeral 1 denotes a counter which may be an 8-bit binary counter, 2 an AND circuit, 3 a memory, such as a ROM, having locations at which predetermined speed instructions has described hereinafter are stored. Numeral 4 denotes an inverter circuit.

A train speed signal A which is one of the inputs to the AND circuit 2 is an output of a speed generator 6 which generates pulses at a frequency which is proportional to the speed of the train, while an operation instruction signal B for the counter 1 is applied to the other input to the AND circuit 2. Under presence of the operation instruction signal B, the train speed signal A is applied to the counter 1 through the AND circuit 2 and a frequency divider by which the train speed signal A is converted to another train speed signal A' including a smaller number of pulses than that of the train speed signal A. The operation instruction signal B may be obtained by any known means which, for example, includes a receiver (not shown) on the train for receiving a signal generated from a signal transmitter (not shown) located at a signalling point which is at a predetermined distance in front of a stop point of the train when the train reaches the signalling point, to thereby produce a high level or "1" signal output, and a flip-flop or bistable multivibrator 5 which, upon reception of the "1" signal at a set terminal S thereof, produces a high level or "1" signal at a terminal Q thereof and, upon stop of the train, receive a high level or "1" signal at a reset terminal R thereof from a circuit not shown to render the output signal at the terminal Q to low level or "0". The high level signal from the terminal Q of the flip-flop 5 is supplied to the AND circuit 2 as the operation instruction signal. When the operation instruction signal B is absent, that is, the low level signal at the output terminal Q is applied to the inverter 4, the inverted output of the inverter 4, i.e. a high level signal is applied to the counter 1.

Figure 2:
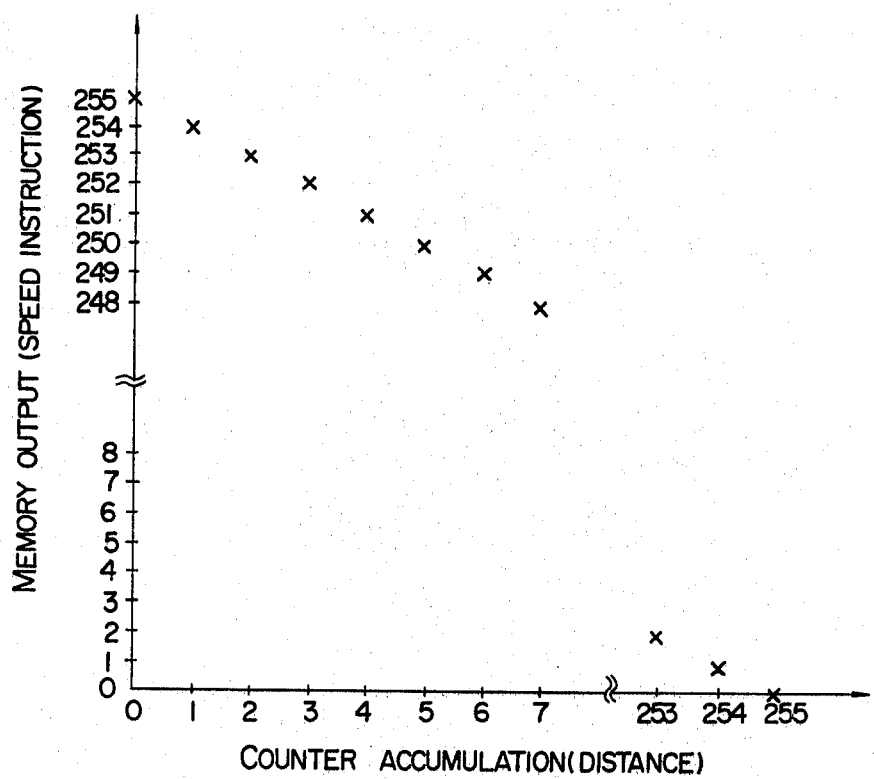
FIG. 2, 3A and 3B are charts for explaining outputs of a memory with respect to contents of a counter shown in FIG. 1.

The content of the counter 1 is supplied as an input C to the memory 3 to designate an address of the memory 3. A content of the memory 3 at the designated address, that is one of the speed instructions, is read out as an output D. For example, when the counter is an 8-bit binary counter as illustrated, if the count output C of the counter is zero, i.e., it is of all "0" bits, address #255 of the memory 3 is designated. As the content of the counter increases, a lower numbered address is designated, and when the content C of the counter is 255, that is, it is of all "1" bits, address #0 is designated. The speed instruction stored in the address #255 of the memory 3 indicates an upper limit of the speed for the train passing through the signalling point, and as the address number decreases the speed indicated by the speed instruction stored there decreases in accordance with the stop pattern and the speed instruction at the address #0 indicates zero speed, that is, stop. FIG. 2 illustrates one example of the relationship between the count of the counter 1 and the speed instruction stored in the memory at an address designated by the count of the counter 1. In FIG. 1, for convenience of the explanation, the output of the memory 3 is also shown as an 8-bit binary output. In the following explanation, it is assumed for the sake of explanation that the address 255 contains 255, i.e. all "1" bits while the address #0 contains zero, i.e. all "0" bits. However, the present invention is not restricted to the specific example.

When the operation instruction signal B is applied to the AND circuit in a manner described above, the train speed signal A is allowed to be applied to the counter 1 through the AND circuit 2 and the frequency divider 7 so that the counter 1 counts a reduced number of pulses A'. The address designation to the memory 3 succeedingly changes with change of the count output C of the counter 1 and data D is read out accordingly. The speed of the train is controlled in accordance with the speed instruction determined by the read out data D.

Figure 3A:
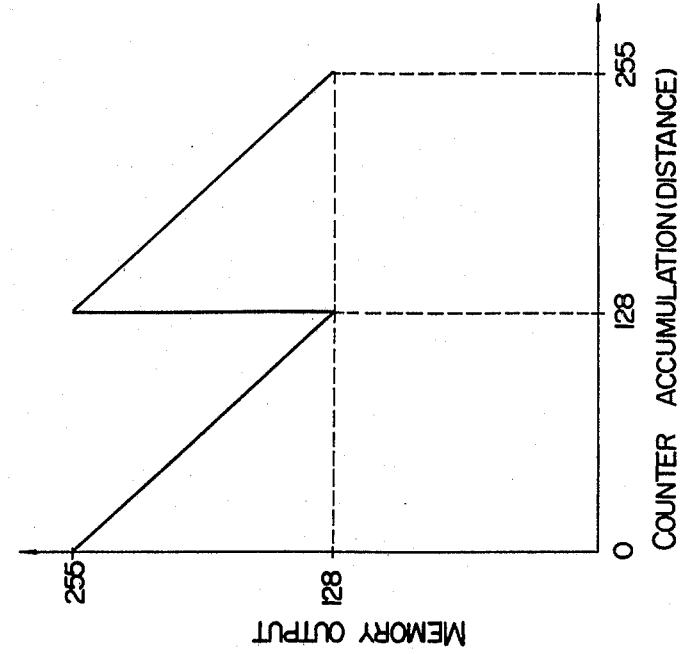
Figure 3B:
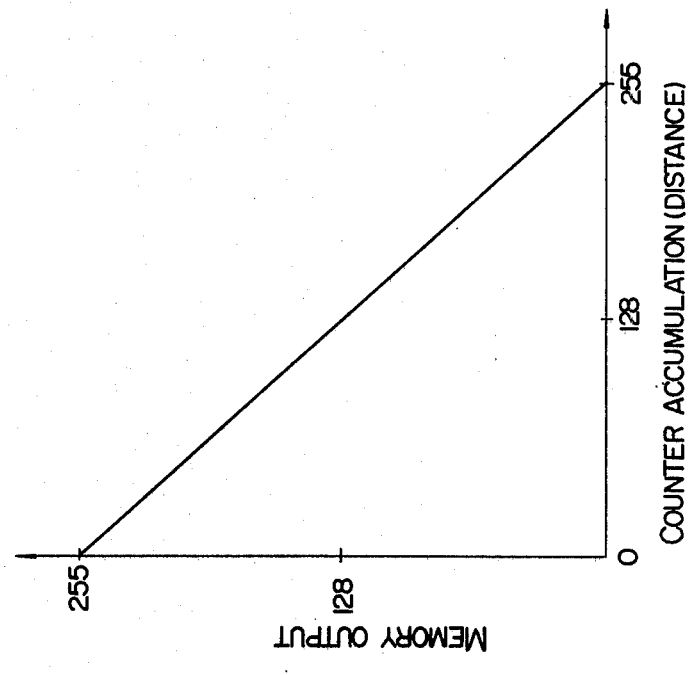

A problem encountered in such a train operation control apparatus is that the driver can not find in advance whether the counter 1 will, or not, operate normally until the train stops when the operation instruction B is applied. The content of the counter 1 should increase one by one from 0 to 255 with application of the input A' thereto. If there is a fault at an intermediate stage of the counter, it can correctly operate its counting until the fault stage takes part in its counting. This means that until the counting operation proceeds to the fault stage, the fault of the counter will not be detected. If the last stage of the counter 1, that is, $2^7$ bit position in the drawing is inoperative, the counter 1 counts up to 127 and then returns to zero. When the operation of the counter 1 is normal, the output D from the memory 3 decreases gradually as shown in FIG. 3A. However, in case of abnormal operation where the 8th stage ($2^7$ bit) of the counter 1, for example, is inoperative, the output of the memory 3 changes in a manner as shown in FIG. 3B.

Where the output of the memory 3 abnormally changes by the fault of the counter 1, it is no longer safe to control the operation of the train by the output of the memory 3. It is dangerous particularly when the train must be stopped based on a stop signal as in the ATS system.

Figure 4:
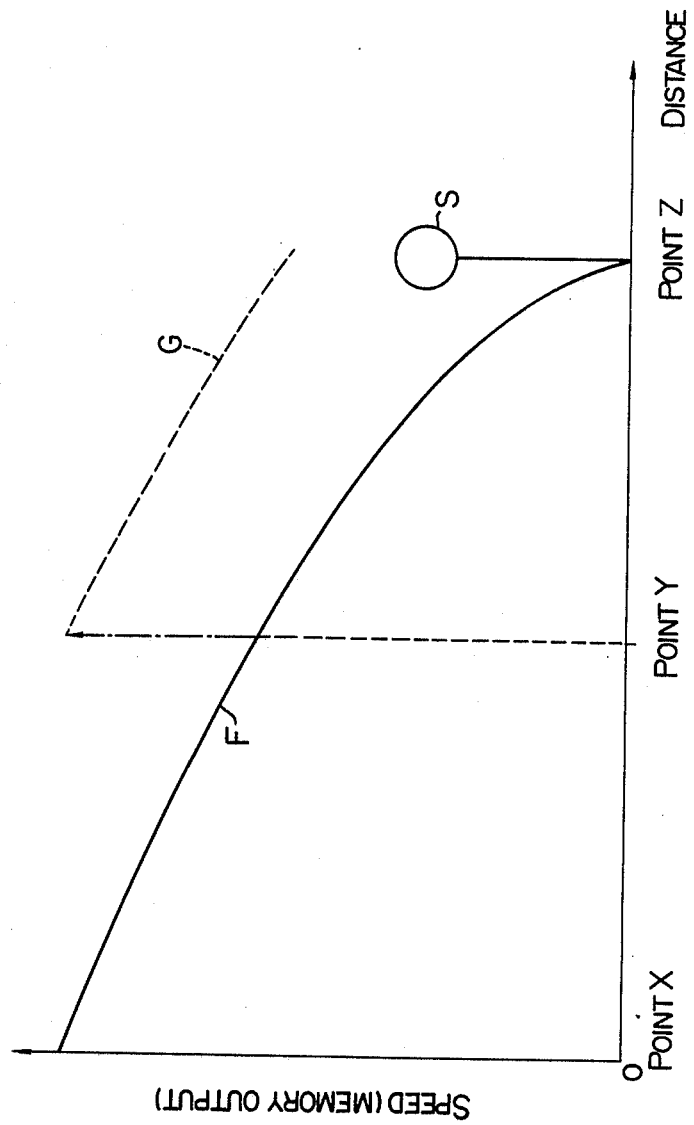
FIG. 4 illustrates a stop pattern for a train.

FIG. 4 shows a chart of a speed curve when the train is decelerated from the signalling point X and stopped at a stop point Z at which a stop signal S is located. A curve F in FIG. 4 shows a stop pattern of the speed instructions to be derived from the memory 3. However, if the counter 1 fails, the stop pattern provided by the train operation control apparatus would follow a broken line curve G shown in FIG. 4. As a result, train would pass the point Z in spite of the presence of the stop signal S and might collide with a leading train. It is particularly dangerous when a driver of the train carelessly over looks the stop signal.

According to the present invention, when the operation instruction signal is applied to the counter 1, the counter 1 is first checked whether it is normal or abnormal, and if the counter is faulty, a brake instruction is issued to the train. In this manner, the safety of operation is assured.

Figure 5:
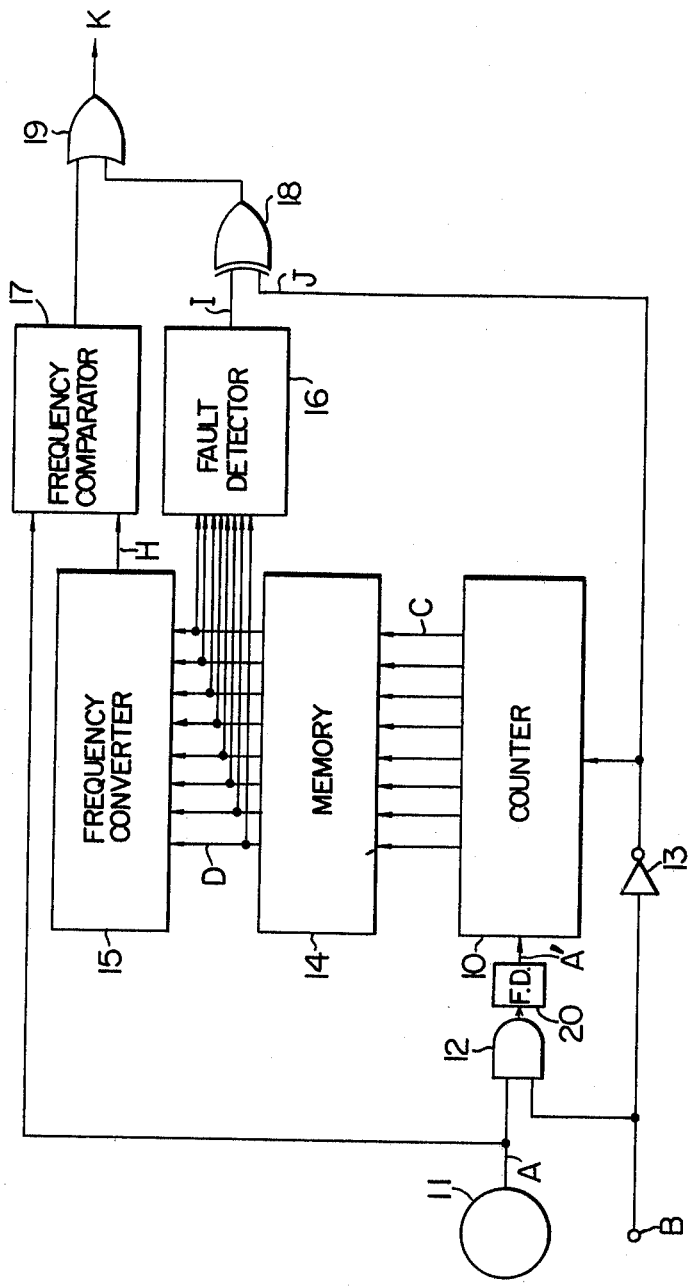
FIG. 5 is a block diagram showing one embodiment of a train operation control apparatus of the present invention.

One embodiment of the present invention will be explained in more detail with reference to the drawings. FIG. 5 shows one embodiment of the train operation control apparatus of the present invention which is applied to the ATS system like in the case of FIG. 1.

In FIG. 5, a count input A applied to a binary counter 10 is generated by a speed generator 11 mounted on the train. That is, the count input A includes pulses generated by the speed generator 11 and having a frequency which is proportional to a speed of the train.

The count input A and an operation instruction signal B are applied to an AND circuit 12 an output of which is applied through a frequency divider 20 to the counter 10. The operation instruction signal B is generated in the above mentioned manner when the train reaches a point at a predetermined distance, e.g. 500 m, in front of a stop point, that is, at a signalling point. The AND circuit 12 is provided to allow the count input A to be applied to the counter 10 only when the operation instruction signal B exists.

The count input A is applied through the frequency divider to the counter 10 while the operation instruction signal B is applied to the counter 10 via an inverter 13. As is well known, the counter 10 comprises a plurality of flip-flops each representing one of binary bits of the count number. The flip-flops are arranged to be at a set condition, i.e. at "1" by an output of the inverter 13 when the operation instruction signal is absent or at the low level, in order to allow a check of the operation of the flip-flops. This means that all of the flip-flops of the counter 10 should be inverted from "1" to "0" by a first pulse of the output of the frequency divider 20. In this manner, the operation of the counter 1 can be checked by the inversion of the flip-flops. In particular, when the counter 10 is of 8-bit, it is set to 255, that is, all "1" bit state before occurrence of the operation instruction signal B. Thus, if the operation of the counter 10 is normal, the counter 10 produces a predetermined count output C in response to the count input A from the AND circuit 12.

The count output C thus generated is applied to a memory 14 as an address input so that a memory content at the designated address is read out of the memory 14.

An output data D from the memory 14 is applied to a binary-frequency converter circuit 15 (hereinafter referred to as a frequency converter 15) and a fault detection circuit 16. The output data D is converted by the frequency converter 15 to a frequency H which is proportional to the binary output of the memory 14. The frequency H is applied to one of the inputs of a frequency comparator 17, while the other input of the comparator 17 is supplied with the output A of the speed generator 11, that is, the pulses of a frequency which is proportional to the speed of the train. The inputs are compared in frequency by the comparator 17, so as to determine whether the train speed exceeds the speed instruction according to a preset pattern, that is, the output of the frequency converter 15. If it is found that the train speed is higher than the speed instruction according to the preset pattern, the comparator 17 issues a brake instruction K through an OR circuit 19.

Figure 7:
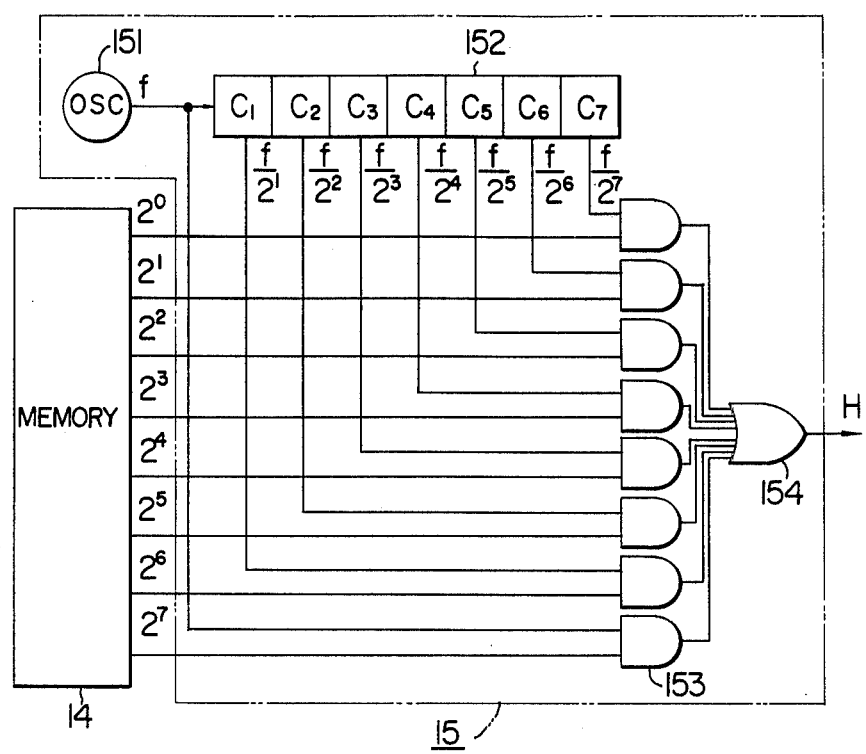
FIG. 7 to 9 show details of portions in FIG. 5.

As shown in FIG. 7, the frequency converter 15 may comprises an oscillator 151 such as a crystal oscillator, a 7-bit counter 152 having seven stages $C_1, C_2, \ldots C_7$, which counts the frequency $f$ of the oscillator 151 thereby producing at the respective stages divided frequency outputs corresponding to $f/2^1, f/2^2, f/2^3, \ldots f/2^7$, respectively, eight AND circuits 153 each of which provides an AND of the respective bit output of the memory 14 and the non-divided or divided frequency output derived from the oscillator 151 or the counter 152, and an OR circuit 154 which provides an OR of the outputs of the AND circuits 153. The output H of the OR circuit 154 is applied to one input of the frequency comparator 17. For example, when the bit contents of the counter 10 are "10101010", respectively, from the lower order, the address #85 of the memory 14 is designated, and the output data from the memory is, for example, "01010101". As a result, $2^1, 2^3, 2^5$ and $2^7$ bit positions of the output of the memory 14 are "1", and the AND circuits associated with the $2^1, 2^3, 2^5$ and $2^7$ bit outputs of the memory 14 allow the concerned frequency outputs to pass therethrough. Accordingly, the frequency appearing at the output H of the OR circuit 154 is a sum of the frequency f from the oscillator 151 and the frequencies $f/2^2, f/2^4$ and $f/2^6$ at the $C_2, C_4$ and $C_6$ bit outputs of the counter 152.

In one embodiment of the present invention, the frequencies of the speed generator and the oscillator are selected as follows:

Speed Generator — 10 Hz per 1 Km/hour of train speed

Oscillator — $f = 384\ Hz$

For example, assuming that the speed instruction "01010101", as abovementioned, corresponding to a decimal value "170" indicates a train speed 51 Km/hr., i.e. 170 × 0.3 Km/hr., the output H in FIG. 7 takes a value of $$(2 + 8 + 32 + 128/128) \times 384 = 510.$$

If the train speed is at 51 Km/hr, when the count of the counter 10 reaches "85", the speed generator produces a frequency of 51 × 10 Hz. Thus, A = H, then no brake instruction is produced. But, if the train speed exceeds 51 Km/hr., the frequency of the output of the speed generator is higher than 510 Hz. Hence, A > H, then the brake instruction is produced.

Figure 9:
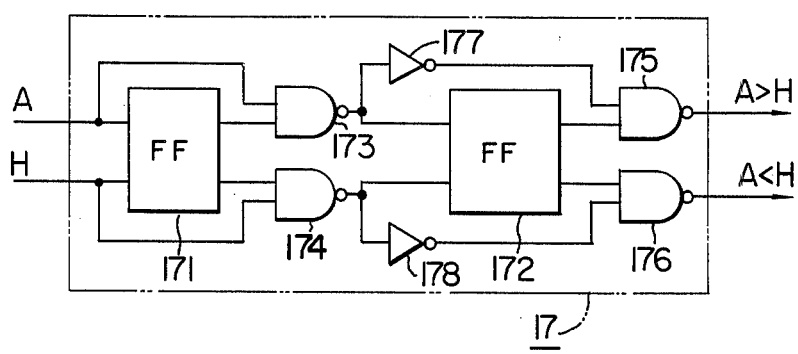

The frequency comparator 17 comprises, as shown in FIG. 9, two flip-flops 171 and 172, four NAND circuits 173 to 176, and two inverter circuits 177 and 178. The frequency comparator shown in FIG. 9 is the same as that disclosed in U.S. Pat. No. 2,985,773.

The NAND circuit 175 of the frequency comparator 17 produces an output when the output A of the speed generator 11 is larger than the speed instruction H given by the memory 14, and this output is passed through the OR circuit 19 as the brake instruction K.

Figure 8:
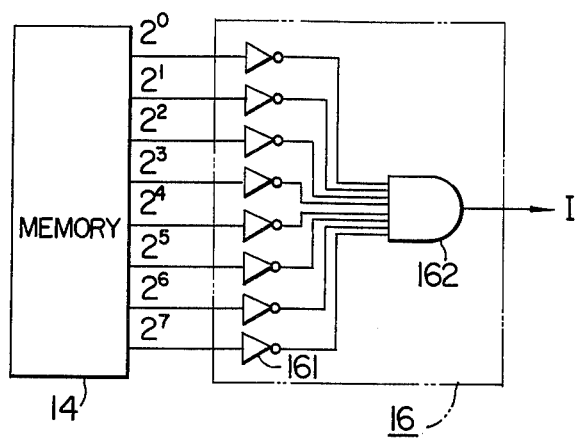

The fault detection circuit 16 for detecting the fault of the counter 10, as shown in FIG. 8, comprises inverters 161 for inverting the respective bit outputs of the memory 14 and an AND circuit 162 to which the outputs of the inverters 161 are applied. As described above, when the operation instruction signal B is absent, the content of the counter 10 is set at 255, as shown in FIG. 6. Under this condition, the memory 14 produces an output corresponding to the address #255, that is, all "0" bit output. As a result, the output of the AND circuit 162 in the fault detection circuit 16 is "1". When the operation instruction signal B is applied, the counter 10 starts to count up the signal A' supplied through the frequency divider from the speed generator 11 and the memory 14 issues the speed instruction. If the operation of the counter 10 is normal, the counter 10 first returns to zero and there starts to count up so that the output of the AND circuit 162 of the fault detection circuit 16 assumes "0".

Thus, when the counter 10 is normal, the output I of the fault detection circuit 16 is 1 during a stand-by mode where the instruction signal B is absent and "0" during an operation mode where the signal B exists, while when the fault exists in the counter 10, the opposite outputs appear at the output I of the detector 16. Accordingly, the fault of the counter 10 can be detected according to the output I.

The output I of the fault detection circuit 16 is applied to an exclusive OR circuit 18 (EOR 18) which, when the condition is met, produces the brake instruction. The operation instruction signal B is applied through the inverter 13 to the EOR 18 so that it conditions the issue of the brake instruction. That is, in the normal state, the inputs I and J to the EOR 18 are both "1" during the stand-by mode, while the inputs I and J are both "0" during the operation mode, resulting in producing no brake instruction. If the address #255 is not designated by the counter 10, that is, if all of the flip-flops of the counter 10 are not "1" when the operation instruction signal B does not exist, it indicates a fault in the counter. In this case, the inputs I and J to the EOR 18 during the stand-by mode are "0" and "1" respectively, resulting in "1" output of the EOR 18. As a result, the brake instruction is issued during the stand-by mode.

The brake instruction issued from the EOR 18 or the frequency comparator 17 is applied through the OR circuit 19 to a train control section (not shown). Thus, when the actual train speed exceeds the speed instruction, or the control circuit is failed, the train is caused to stop.

As described above, since the brake instruction from the EOR 18 is issued during the stand-by mode, the arrangement is significant from the standpoint of safety. This is particularly effective when the driver is not aware of the faults of the counter which would prevent the flip-flops of the counter 10 from normal operation when the operation instruction signal is applied thereto.

When the train speed is to be controlled according to a stop pattern as shown in FIG. 4, the control is arranged to set all of the flip-flops of the counter 10 at "1" during the stand-by mode so that the train speed is controlled at the safety side whenever the counter does not operate normally after occurrence of the operation signal. That is, the condition of all flip-flops being "1" is corresponding to the count at the point Z in FIG. 4 where the train is to be stopped and hence if the counter does not operate normally when the train reaches the point X where the stop pattern assumes its largest value, the speed instruction of speed "0" corresponding to the point Z is produced thereby applying a brake instruction to the train. This is also true when the counter is failed such that its, for example, 8th stage of flip-flop is not reset to "0" and continues its set condition or "1". In such a case, the output of the counter 10 takes a value which the counter should take at the point Y if the counter would operate normally.

While the counter 10 has been explained to be set to the maximum count in the above embodiment, it is not necessarily set to the maximum count but it may be set to a high count near the maximum count with lower order bits being omitted, to attain a similar effect.

As described hereinabove, according to the present invention, the counter is preset to or near its maximum count so that the minimum speed instruction is read out of the memory at the start of operation, and the presence or absence of the abnormal state of the counter is determined based on the output of the memory. As a result, the fault of the counter can be detected prior to the application of the operation instruction signal and even if the fault exists the brake instruction is issued to the train so that the safety of the operation control of the train is assured.

What is claimed is:

1. A train operation control apparatus comprising:
a counter which starts to count an input signal having a frequency proportional to a running speed of the train in response to an operation signal which is produced when the train passes a predetermined point, the content of the counter being indicative of the distance which the train has travelled after passing the predetermined point,
a memory having locations for storing speed instructions predetermined according to the distance which the train has travelled after passing the predetermined point, said instructions being selectively read out according to the content of said counter,
means for setting the content of said counter at a predetermined value before said operation signal is produced,
a fault detection circuit for detecting a failure of said counter according to the content of said memory which is read out in response to said operation signal, and
a brake instruction circuit for producing a brake instruction applied to the train upon detection of the failure of said counter, said brake instruction circuit including an exclusive OR circuit which exclusively ORs the output of said fault detection circuit and said operation instruction signal.

2. A train operation control apparatus according to claim 1 wherein said memory stores stop patterns in which speeds decrease with the travelled distance of the train at predetermined decelerations.

3. A train operation control apparatus according to claim 1, wherein said fault detection circuit includes a logic circuit for determining whether the content read out of said memory follows the count preset to said counter.

4. A train operation control apparatus comprising:
a memory for prestoring stop patterns in which speeds decrease with the travelled distance of a train at predetermined decelerations,
a counter adapted to receive an operation instruction signal upon train's passing through a predetermined point to count up input signals of a frequency representative of a travel speed of the train, a content of said counter being indicative of the travelled distance of the train, the content of said counter determining a speed instruction to be read out of said memory, said counter being preset to or near its maximum count prior to the start of operation so that a minimum speed instruction is read out of said memory at the start of operation;
a frequency converter circuit for producing a frequency output corresponding to the speed instruction read out of said memory;
a frequency comparator for comparing the frequency output from said frequency converter circuit with the frequency of said input signals representative of the travel speed of the train to issue a brake instruction to the train when the frequency of the travel speed signal is higher than the frequency of the output of said frequency converter circuit;
a fault detection circuit for logically determining whether the content read out of said memory follows the count preset to said counter to detect any fault in said counter; and
a brake instruction circuit for issuing a brake instruction to the train in response to the output of said fault detection circuit.

5. A train operation control apparatus according to claim 4, wherein said memory is a read only memory.

6. A train operation control apparatus according to claim 5, wherein said fault detection circuit includes a logic circuit for inverting the bits read out of said memory and ANDing the inverted bits.

* * * * *